US012566896B2

(12) United States Patent
Ramani et al.

(10) Patent No.: US 12,566,896 B2
(45) Date of Patent: Mar. 3, 2026

(54) DYNAMIC OPERATING MODE AND DATASET-BASED REGISTER ACCESS LOCKING

(71) Applicant: CIRRUS LOGIC INTERNATIONAL SEMICONDUCTOR LTD., Edinburgh (GB)

(72) Inventors: Arun R. Ramani, Austin, TX (US); Amar Vellanki, Cedar Park, TX (US); Brent W. Wilson, Austin, TX (US); Nathan D. P. Buchanan, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 282 days.

(21) Appl. No.: 18/454,307

(22) Filed: Aug. 23, 2023

(65) Prior Publication Data

US 2025/0068779 A1 Feb. 27, 2025

(51) Int. Cl.
*G06F 21/85* (2013.01)
*G06F 21/60* (2013.01)
*G06F 13/40* (2006.01)
*G06F 21/74* (2013.01)
*H04N 23/55* (2023.01)
*H04N 23/663* (2023.01)

(52) U.S. Cl.
CPC ............ *G06F 21/85* (2013.01); *G06F 21/602* (2013.01); *G06F 21/604* (2013.01); *G06F 13/404* (2013.01); *G06F 21/74* (2013.01); *H04N 23/55* (2023.01); *H04N 23/663* (2023.01)

(58) Field of Classification Search
CPC ...... G06F 21/85; G06F 21/602; G06F 21/604; G06F 21/74; G06F 13/404; H04N 23/55; H04N 23/663
See application file for complete search history.

(56) References Cited

U.S. PATENT DOCUMENTS

| 7,657,722 B1 | 2/2010 | De Angel et al. |
| 8,695,010 B2 | 4/2014 | Frazier et al. |
| (Continued) | | |

OTHER PUBLICATIONS

U.S. Appl. No. 18/460,255, filed Sep. 1, 2023. (pp. 1-31 in pdf).

*Primary Examiner* — Ellen Tran
(74) *Attorney, Agent, or Firm* — Mitch Harris, Atty at Law, LLC; Andrew Mitchell Harris

(57) ABSTRACT

An integrated circuit (IC), including multiple registers and functional units for performing operations of the integrated circuit, provides security of register accesses. A bus interface controller coupled to the registers provides read/write access from bus interface. The IC includes a state controller for managing multiple operational modes, and an access control manager coupled to the state controller and the bus interface controller that asserts a dynamic lock over the accesses to the registers according to a selected operating mode and one or more protected addresses of the addressable register space corresponding to the current operating mode. A data screener compares data associated with the read or write accesses to sets of valid or invalid data values for the current operating mode and the protected addresses, and the access control manager permits or denies the read or write accesses in conformity with a result of the comparison.

20 Claims, 8 Drawing Sheets

(56) References Cited

U.S. PATENT DOCUMENTS

| | | | |
|---|---|---|---|
| 9,171,161 B2 | 10/2015 | Anbalagan et al. | |
| 2019/0080082 A1* | 3/2019 | Desai | G06F 21/575 |
| 2021/0264066 A1* | 8/2021 | Barzic | G06F 21/85 |
| 2022/0197366 A1* | 6/2022 | Patel | G06F 1/3206 |
| 2022/0197995 A1* | 6/2022 | Shanbhogue | G06F 9/526 |
| 2022/0391540 A1* | 12/2022 | Roberts | G06F 21/64 |

* cited by examiner

30A

70C

DYNAMIC OPERATING MODE AND DATASET-BASED REGISTER ACCESS LOCKING

BACKGROUND

1. Field of Disclosure

The field of representative embodiments of this disclosure relates to integrated circuits (ICs) including a bus interface with addressable register spaces and their operating methods, and in particular, to ICs that implement dynamic locks on register access based on an operating mode and read or write value datasets.

2. Background

Securing assets and generally protecting operation has long been important in integrated circuits (ICs) that manage data and devices. In particular, ICs that include and/or implement processing cores may be subject to intrusion by methods such as compromising internal firmware and/or manipulation of clock and control signals in such a manner as to cause the IC to enter disallowed states that can then either bypass security measures, or reveal private tokens, such as encryption/decryption keys that are used to secure digital assets or ensure trusted operation.

Therefore, many ICs currently in-use provide security operations, such as encryption, decryption and signing of assets to verify their validity, in order to protect the assets and/or ensure proper operation even when the ICs may be attacked by unauthorized/malicious connections. In trusted systems, measures to prevent such access or attacks leading to improper operation are generally a requirement for validation of such systems, and a compromise that may be revealed at validation testing, or subsequently in a product stream in production, may lead to costly and catastrophic consequences.

Therefore, it would be advantageous to provide ICs having mechanisms for securing internal storage, such as register values, against attacks both from external devices and from internal firmware or microcode that might be compromised by an attack.

SUMMARY

Improved security of register values and operations in an IC are provided by an IC and an associated method of operation.

The IC includes multiple registers and functional units for performing operations and a bus interface controller coupled to the registers that provides read/write access from bus interface. The IC also includes a state controller for managing multiple operational modes of the IC, and an access control manager coupled to the state controller and the bus interface controller that asserts a dynamic lock over the accesses to the registers according to a selected operating mode and one or more protected addresses of the addressable register space corresponding to the current operating mode. The IC also includes a data screener that compares data associated with the read or write accesses to sets of valid or invalid data values for the current operating mode and the protected addresses, and the access control manager permits or denies the read or write accesses in conformity with a result of the comparison.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses ICs that include multiple registers and functional units for performing operations while providing security of register accesses. A bus interface controller coupled to the registers provides read/write access from bus interface. A state controller manages multiple operational modes, and an access control manager coupled to both the state controller and the bus interface controller asserts a dynamic lock over accesses to the registers. The dynamic lock is asserted according to a selected operating mode and one or more protected addresses of the addressable register space corresponding to the current operating mode. A data screener within the IC compares data associated with the read or write accesses to sets of valid or invalid data values for the current operating mode and the protected addresses, and the access control manager permits or denies the read or write accesses in conformity with a result of the comparison.

Figure 1:
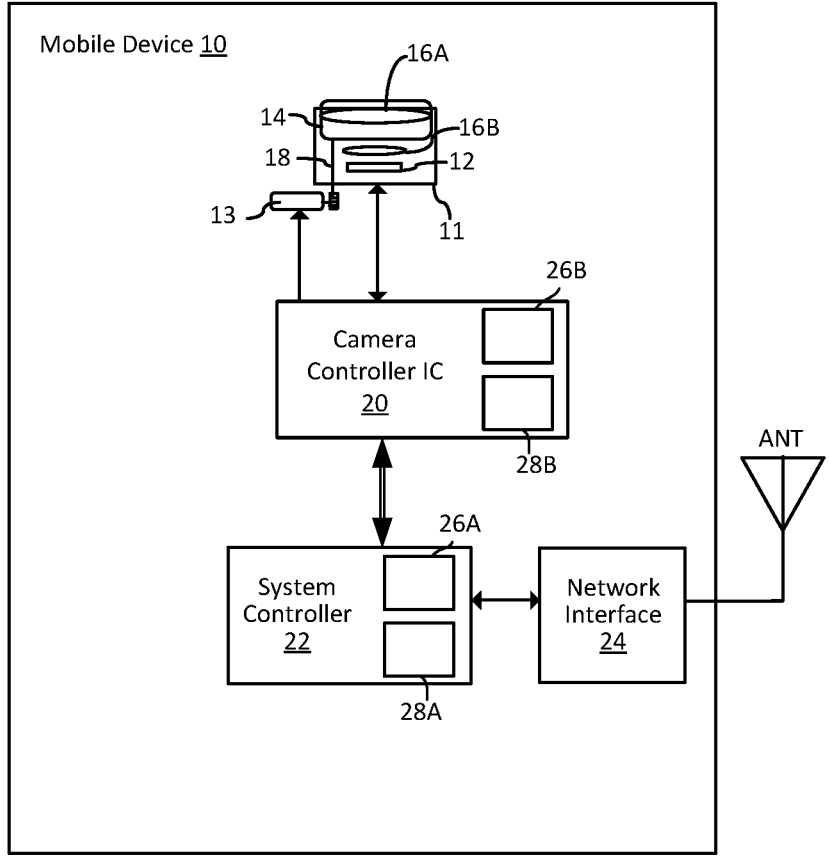
FIG. 1 is a block diagram illustrating an example mobile device 10 implementing example register security, in accordance with an embodiment of the disclosure.

Referring now to FIG. 1, a block diagram of an example mobile device 10 implementing example register security is shown, in accordance with an embodiment of the disclosure. Example mobile device 10 may be a wireless mobile telephone, tablet, notebook computer, or a similar device. Alternatively, mobile device may be a digital camera or other system that incorporates a position-controlled image sensor. Operation of mobile device 10 is controlled by a system controller 22, which may be a microcontroller, microprocessor or other processor core, and includes one or more volatile storage units 26A and non-volatile storage units 28A for storage of program instructions and data values. System controller 22 is coupled to a camera controller IC 20, which provides an interface to control and retrieve data from a camera 11, and which includes one or more volatile storage units 26B and non-volatile storage units 28B for storage of program instructions and data values. The program instructions may form a computer-program product in accordance with an embodiment of the disclosure, and the data values may include program data and other data such as media, including digital photographs.

The techniques disclosed herein provide register security within camera controller IC 20, which may be used to secure camera controller IC 20 against attacks that provide access to control of camera 11 and/or access to digital media retrieved from camera 11. System controller 22 is also coupled to a network interface 24 that provides for connection of mobile device 10 to a wireless network via an antenna ANT, but is not required for implementation of embodiments according to the disclosure, for example a camera control system in a mobile device such as a digital camera providing only a wired interface. Camera controller IC 20 includes circuits for controlling one or more motors 13 that position a movable lens 16A or multiple lenses of camera 11, and/or image sensor 12 of camera 11. In the illustrated embodiment, movable lens 16A is positioned by a mount 14, coupled to the one or more motors 13 via a mechanical linkage 18. A mount of image sensor and additional motors (not shown) may be provided to move image sensor 12 in one or more axes, in response to the commands. Camera controller IC 20 provides an interface for receiving data from an image sensor 12 of a camera 11 within mobile device 10 and also a motor controller that controls the one or more motors 13, which may provide zoom, auto-focus and image stabilization functions, by moving lens 16 and/or image sensor 13. Another fixed lens 16B receives an image from movable lens 16A to produce an image of the subject of a photograph or other image processing subject on image sensor 12. Mobile device is only one example of a device in which techniques according to embodiments of the disclosure may be practiced, and the techniques disclosed herein may apply to other types of devices in which register security may be implemented according to embodiments of the disclosure.

Figure 2:
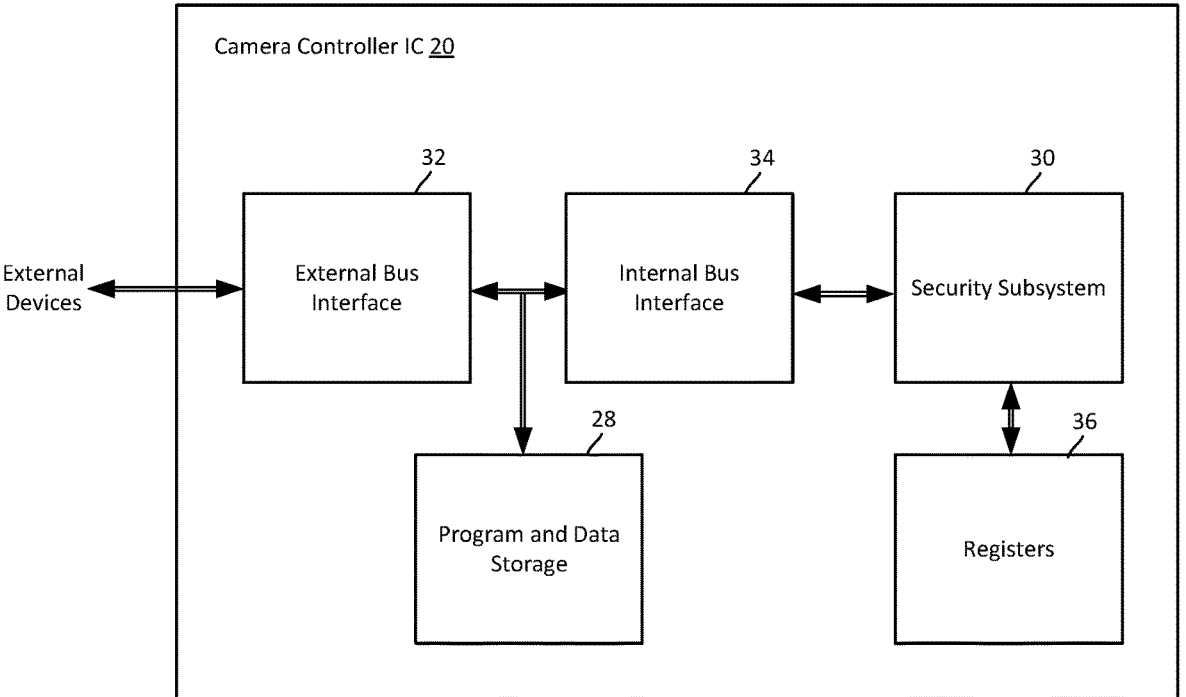
FIG. 2 is a block diagram illustrating an example camera controller IC 20 that may be used to implement camera controller IC 20 of FIG. 1, in accordance with an embodiment of the disclosure.

Referring now to FIG. 2, a block diagram illustrating an example camera controller IC 20 that may be used to implement camera controller IC 20 of FIG. 1 is shown, in accordance with an embodiment of the disclosure. An external bus interface 32 provides for connection of camera controller IC 20 to external devices, such as system controller 22 in mobile device 10 of FIG. 1 via one or more external bus connections, which may implement a serial or parallel interface, and which may be a standardized interface, or a proprietary interface. An internal bus 34 couples external bus interface 32 to a security subsystem 30, which, in conjunction with internal bus interface 34, provides access to multiple storage registers 36 within camera controller IC 20, while preventing unallowed programming or reading of values within storage registers 36, depending on a current mode of operation of camera controller IC 20, the particular registers of storage registers 36 as specified by an address of the individual one(s) of storage registers 36 being accessed by an operation, and the data values associated with the individual register(s) being accessed. The data values for a write operation performed on the individual register(s) may be the data supplied from internal bus interface 34, and the data values for a read operation are the values stored in the individual register(s).

Storage registers 36 form an addressable register space, which may be indexed according to a portion of or all of an address field, or may be accessed according to addresses within a larger address space, e.g., the addresses may form part of an address space that encompasses volatile storage units 26B and non-volatile storage units 28B in camera controller ID 20, as shown in FIG. 1. The individual registers themselves may store control values, which may be write-only with respect to external access, image data or other data values, which may be read-only with respect to external access, or the registers may provide external read and write access, as limited by the security mechanisms disclosed herein. The security mechanisms implemented by security subsystem 30 may include prevention of writing invalid control register values for both operational and security reasons, and prevention of reading or writing particular data register values, both conditionally per the operating mode of camera controller IC 20 and particular allowed or disallowed data values, and for general register access prevention, such as writing of a data register that is not allowed from internal bus interface 34 generally, such as a data register that is only written-to by other functional units within camera controller IC 20.

Figure 3:
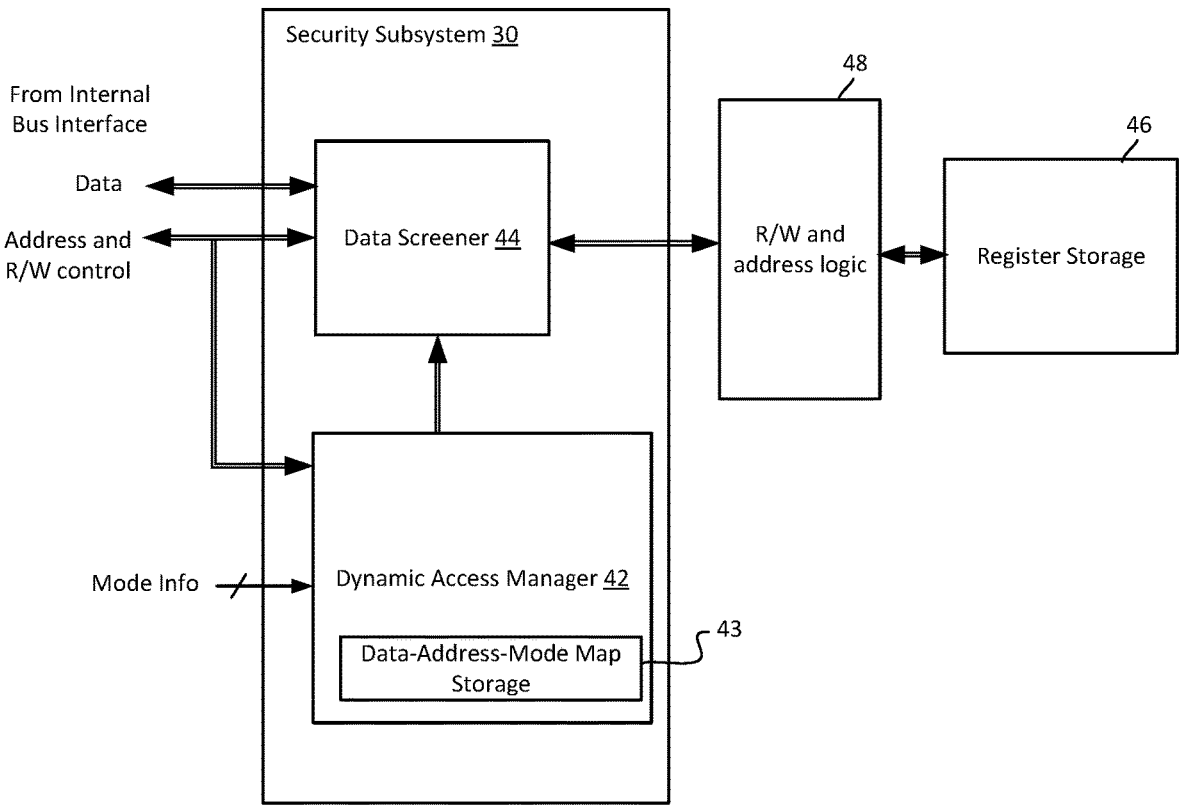
FIG. 3 is a block diagram illustrating details of example security and interface circuits as may be included within example camera controller IC 20 of FIG. 2, in accordance with an embodiment of the disclosure.

Referring now to FIG. 3, a block diagram illustrating details of example security and interface circuits as may be included within example camera controller IC 20 of FIG. 2 is shown, in accordance with an embodiment of the disclosure. Security subsystem 30 receives data, address and control signals from internal bus interface 34 of FIG. 2, and implements two units that control security of register operations. The first unit is a dynamic access manager 42 that determines whether a register address associated with an incoming register read or write operation is authorized for access for a current operating mode, determined from mode information Mode Info received from one or more units within camera controller IC 20. The second unit is a data screener 44 that compares stored data values for the particular register that specify either allowed or disallowed data values. Since a check against all disallowed data values is equivalent to a check against all allowed data values, which type of data values are stored may be determined by whichever set is sparser for a given application. For example, some applications may need to prevent writing of only a few particular values within a control register, allowing all other combinations, in which instance the set of disallowed data vales will be small, and would be the most efficiently stored. Other applications may require disallowing most every value except a particular small set of values, in which case the set of allowed data vales will be small, and would be the most efficiently stored. The set of data values in example security subsystem are provided from dynamic access manager 42, which selects the subset of allowed/disallowed values from a Data-Address-Mode map storage 43 to data screener 44, according to the particulars of the operation received from internal bus interface 34, including whether the access is read or write, the address being read/or written, and the operating mode of camera controller IC 20. Data screener 44 then determines whether or not the operation is authorized, and if the operation is authorized, the access is passed to a read/write (R/W) and address logic block 48, which performs the access on a register storage 46.

Figure 4A:
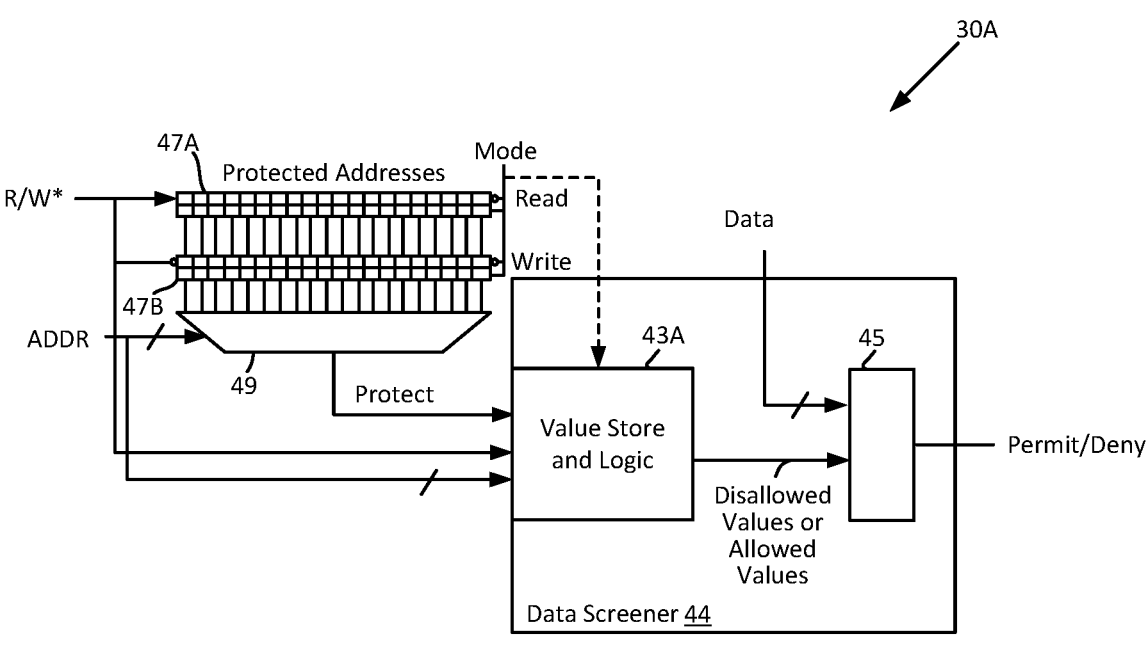
FIG. 4A is a simplified schematic diagram of an example security subsystem 30A that may be used to implement security subsystem 30 in camera controller IC 20 of FIG. 2, in accordance with an embodiment of the disclosure.

Referring now to FIG. 4A, a simplified schematic diagram of an example security subsystem 30A that may be used to implement security subsystem 30 in camera controller IC 20 of FIG. 2 is shown, in accordance with an embodiment of the disclosure. Security subsystem 30A is a logic implementation that detects protected operations based on a read bit array 47A and a write bit array 47B, which are selected between based on a state of control signal R/W*, which is logical-TRUE for a read operation and logical-FALSE for a write operation. Each of read bit array 47A and a write bit array 47B contains two independent words of protection control bits, selected according to a single-bit control signal Mode, which indicates an operating mode, e.g., a security operating mode and another mode requiring less-secure operation. Any number of modes may be supported by increasing the mode dimension of read bit array 47A and a write bit array 47B. A data selector 49 selects one of the individual bits of the particular protection control word selected according to control signal R/W* and control signal Mode, the bit selected according to the address specified by address signal(s) ADDR, which provides an output signal Protect, which indicates whether or not, for the given operation type (read/write), operating mode, and address, the operation is protected. If protection control signal Protect is asserted, data screener 44 retrieves the corresponding set of (allowed or disallowed) data values, which are compared to a data value Data provided from internal bus interface 34 by a comparator/equality detector 45. If control signal Protect is de-asserted or all the checks performed by comparator/equality detector 45 pass, data screener 44 asserts control signal Permit/Deny to indicate whether to permit or deny the access to register storage 46 and R/W address logic 48 of FIG. 3.

Figure 4B:
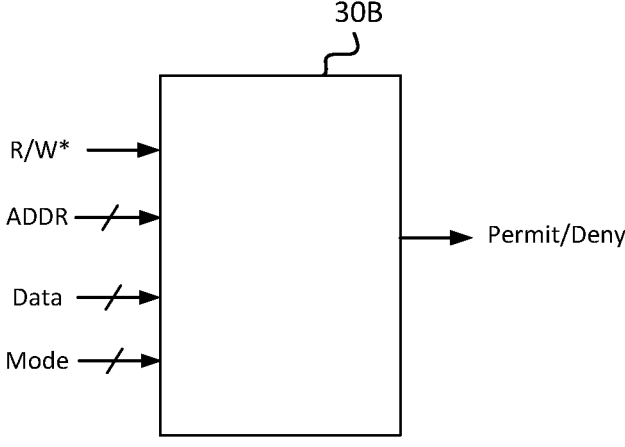
FIG. 4B is a block diagram of another example security subsystem 30B that may be used to implement security subsystem 30 in camera controller IC 20 of FIG. 2, in accordance with another embodiment of the disclosure.

Referring now to FIG. 4B, a block diagram of another example security subsystem 30B that may be used to implement security subsystem 30 in camera controller IC 20 of FIG. 2 is shown, in accordance with another embodiment of the disclosure. Example security subsystem 30B represents a software/microcode or synthesized logic implementation of security subsystem 30 of FIG. 3, in which a particular combination of control signal R/W*, control signal Mode, and address specified by address signal(s) ADDR, cause comparison of disallowed/allowed data values to determine a value for control signal Permit/Deny for the combination. In a synthesized logic implementation, particularly for sparse sets of disallowed or allowed values, the data comparison may be subsumed in the logic, otherwise, storage may be included in example security subsystem 30B, as such storage would be provided in software/microcode implementation.

Figure 5:
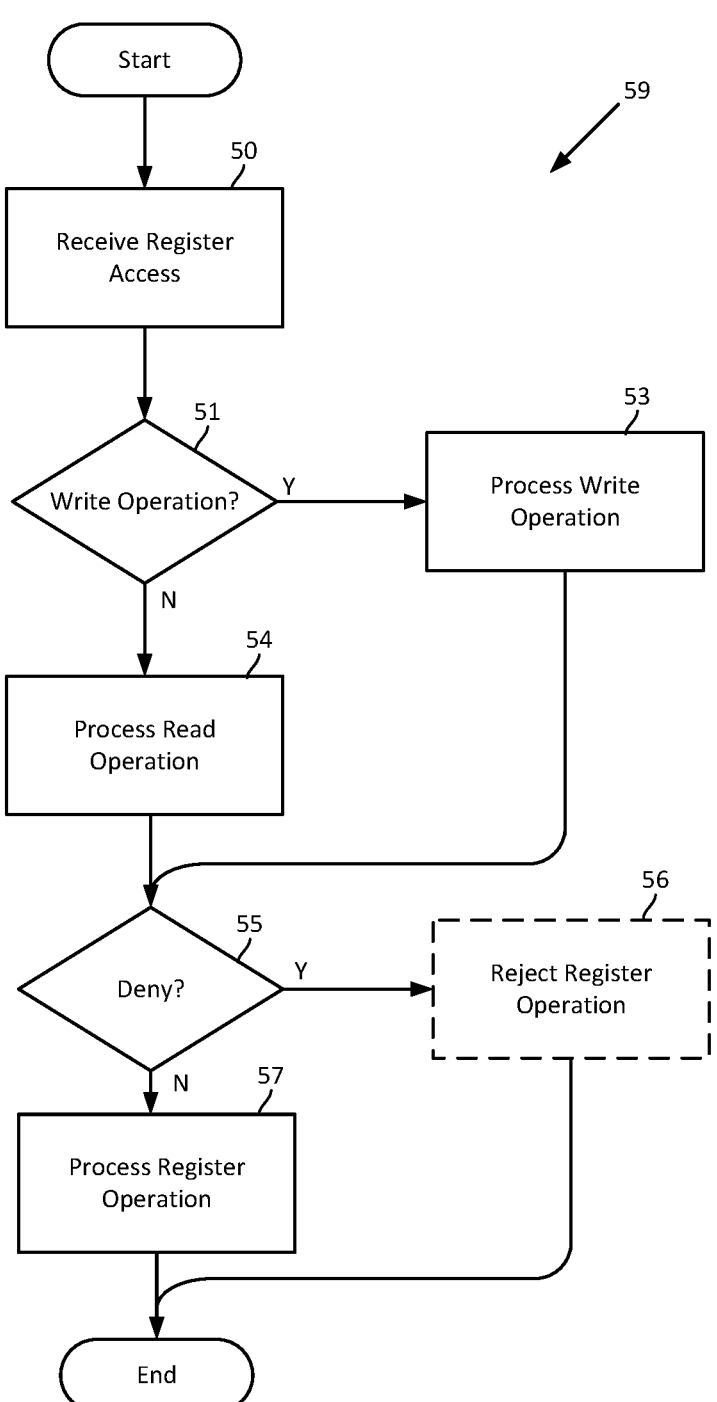
FIG. 5 is an example flowchart 59 illustrating details of operation of security subsystem 30, in accordance with an embodiment of the disclosure.

Referring now to FIG. 5, an example flowchart 59 illustrating details of operation of security subsystem 30 is shown, in accordance with an embodiment of the disclosure. Flowchart 59 illustrates a process that may be implemented by a software/microcode or synthesized logic implementation of security subsystem 30 of FIG. 3 as exemplified by example security subsystem 30B of FIG. 4B. When a register access is received (step 50), if the operation is a register write operation (decision 51), the operation is processed as a write operation (step 52). If the processing results in a result indicating that access is denied (decision 55), the operation may be rejected (step 56), alternatively, the operation is processed (step 57). As an alternative to rejecting the operation in step 56, the operation may be ignored, which may prevent an attacker being informed that the operation was rejected. If the operation is a register read operation (decision 51), the operation is processed as a read operation (step 54), and processing continues from decision 55.

Figure 6:
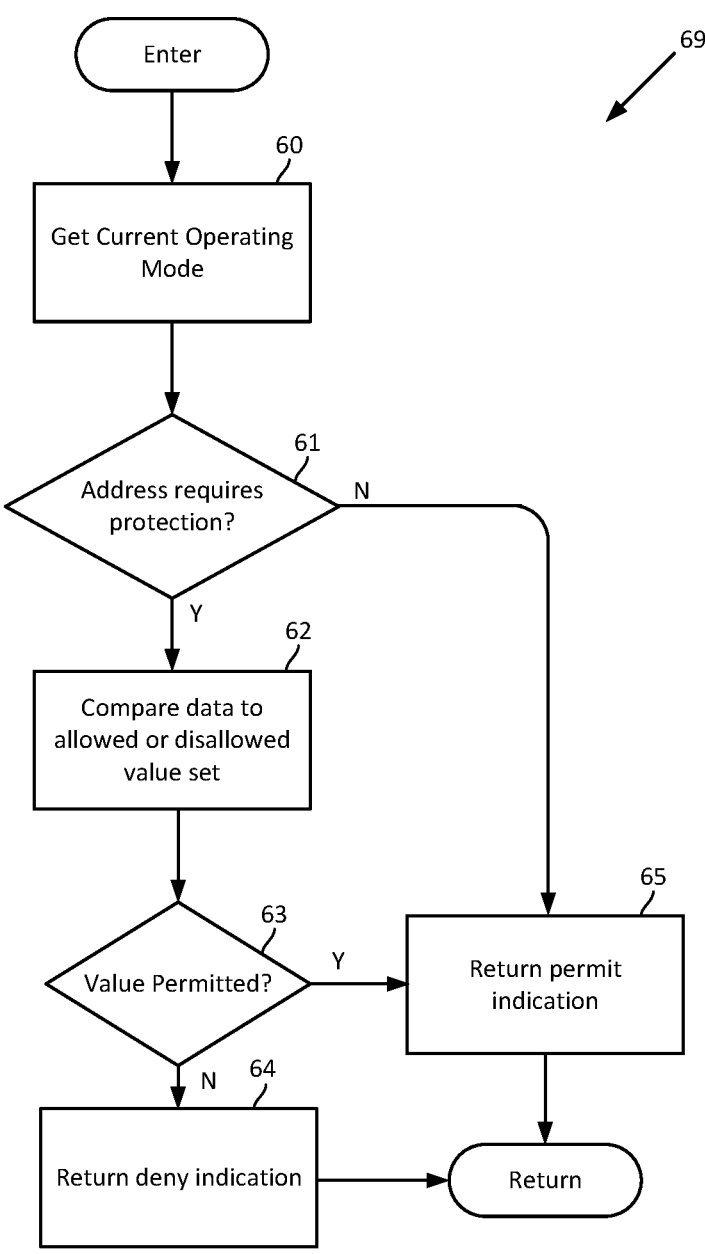
FIG. 6 is an example flowchart 69 illustrating details of operation of processing steps 53 and 54 in the example flowchart of FIG. 5, in accordance with an embodiment of the disclosure.

Referring now to FIG. 6, an example flowchart 69 illustrating details of operation of processing steps 53 and 54 in the example flowchart of FIG. 5 is shown, in accordance with an embodiment of the disclosure. First, the current operating mode is determined (step 60). If the register address is not a protected address (decision 61), a permit access indication is returned (step 65). Otherwise, the data is compared to the allowed or disallowed data set for the address and operating mode (step 62). If the data value is permitted (decision 63), which for a read operation means the value already stored in the register matches an allowed value in an allowed value data set or does not match any of the disallowed values in a disallowed data set, a permit access indication is returned (step 65). If the data value is not permitted (decision 63), a deny access indication is returned (step 64).

Figure 7A:
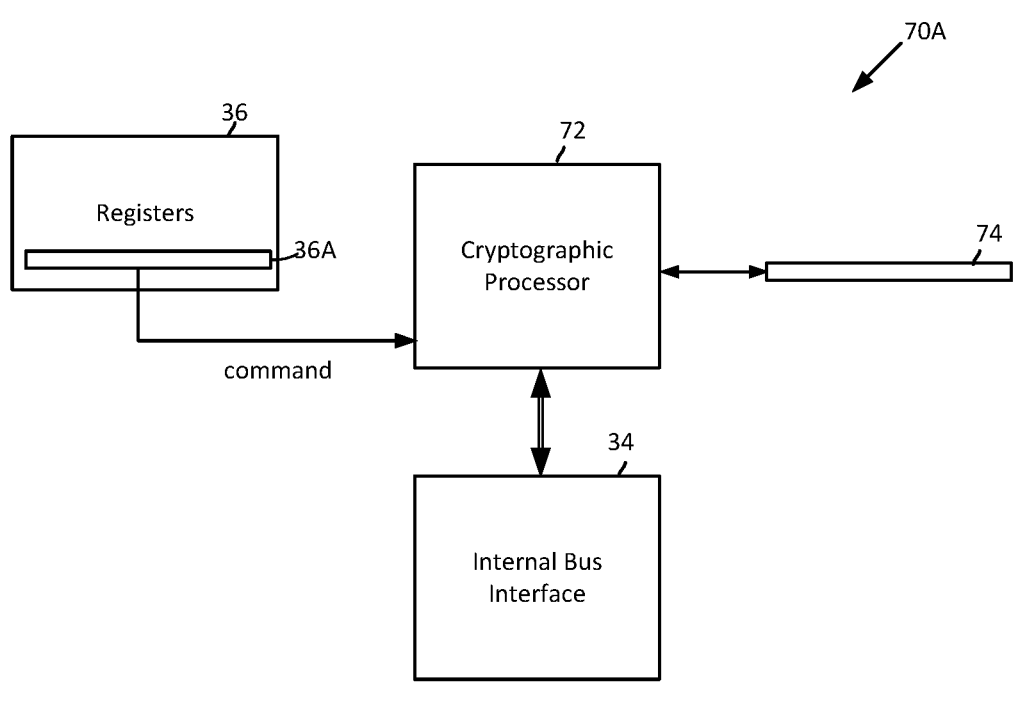
FIG. 7A is an example block diagram 70A illustrating details of an example application of security subsystem 30, in accordance with an embodiment of the disclosure.

Referring now to FIG. 7A, an example block diagram 70A illustrating details of an example application of security subsystem 30 is shown, in accordance with an embodiment of the disclosure. As mentioned above, embodiments of the disclosure are not limited to camera control ICs, and the scheme/circuit illustrated in example block diagram 70A may be applied in another type of IC. Example block diagram 70A illustrates a system having a cryptographic processor 72 that performs operations such as encryption, decryption and authentication based on a private key stored in a protected storage 74. Protected storage may be one of registers 36 as described above with reference to FIG. 2, or may be a separate storage not accessible directly by internal bus interface 34 of FIG. 2. Within registers 36, a command register 36A that controls operation of cryptographic processor 72 is exposed, and access to command register 36A may be conditioned by the operation of security subsystem 30 as described above, so that access is provided for only particular values written to command register 36A, in certain operating modes, and denied for other values/operating modes. In the particular example, access to command register 36A is conditioned to prevent writing commands corresponding to certain atomic operations that are supported by cryptographic processor 72, while an encryption/decryption or authentication operation is being performed in which access to the private key stored in protected storage 74, and which corresponds to a cryptography-in-progress operating mode. For example, all operations of cryptographic processor 72 that involve reading values provided to internal bus interface 34 of FIG. 2 may be disallowed while the private key stored in protected storage 74 is loaded into cryptographic processor 72 to perform the cryptographic operations.

Figure 7B:
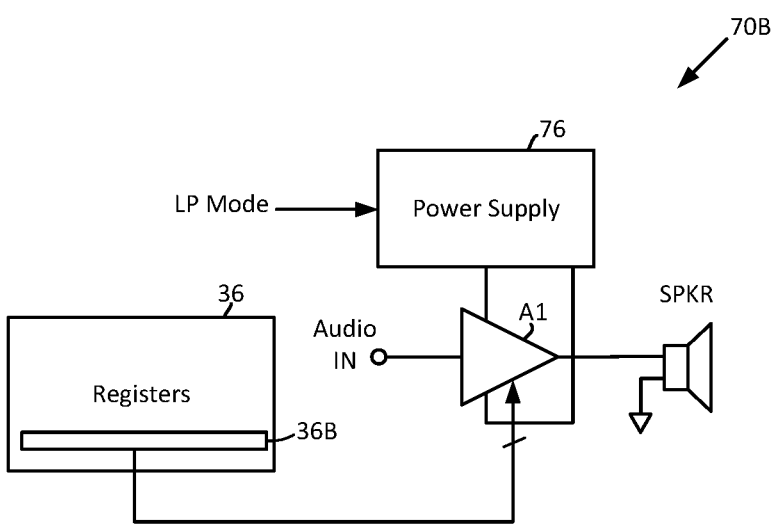
FIG. 7B is an example block diagram 70B illustrating details of another example application of security subsystem 30, in accordance with an embodiment of the disclosure.

Referring now to FIG. 7B, an example block diagram 70B illustrating details of another example application of security subsystem 30 is shown, in accordance with an embodiment of the disclosure. As mentioned above, embodiments of the disclosure are not limited to camera control ICs, and the scheme/circuit illustrated in example block diagram 70B may be applied in another type of IC. Example block diagram 70B illustrates an audio system having an amplifier A1 that provides an audio output signal to a speaker SPKR or other transducer from an input signal Audio IN. A low-power mode control signal LP Mode is provided to a power supply 76 that provides power supply rail voltages to amplifier A1, which are greater in magnitude for a higher-power operating mode and lesser in magnitude for the low-power operating mode. A gain of amplifier A1 is programmable by digital values received from a gain setting register 36B. When power supply 76 is in the low-power operating mode, gain values writable to gain setting register 36B that produce a gain of amplifier A1 that might cause the output of amplifier A1 to reach or exceed the power supply rails may be prevented by including those gain values in the set of disallowed data values for the low-power operating mode, for the address corresponding to gain setting register 36B.

Figure 7C:
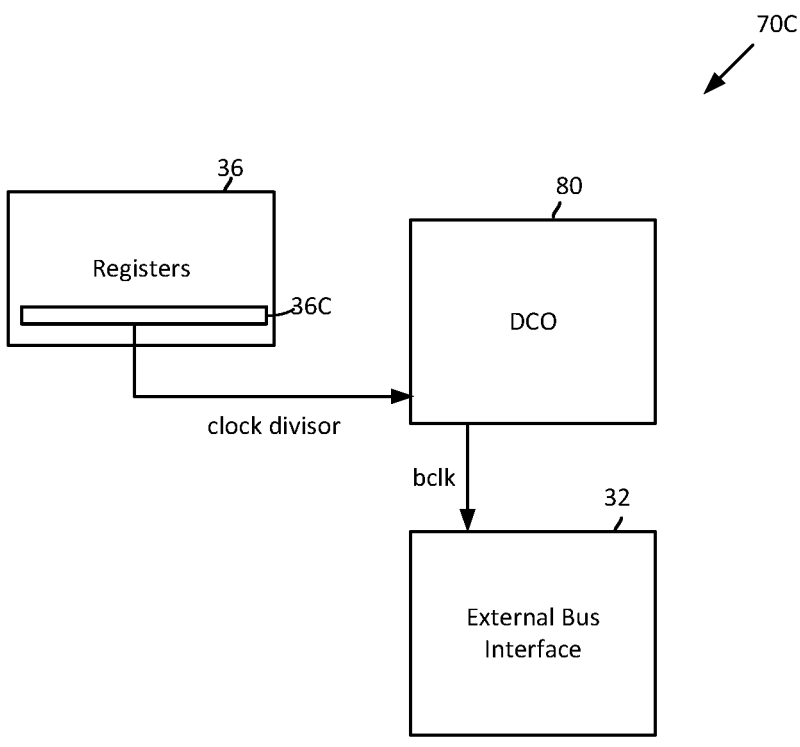
FIG. 7C is an example block diagram 70C illustrating details of another example application of security subsystem 30, in accordance with an embodiment of the disclosure.

Referring now to FIG. 7C, an example block diagram 70C illustrating details of another example application of security subsystem 30 is shown, in accordance with an embodiment of the disclosure. As mentioned above, embodiments of the disclosure are not limited to camera control ICs, and the scheme/circuit illustrated in example block diagram 70C may be applied in another type of IC, but may be implemented, for example in camera controller IC 20 of FIG. 2. Example block diagram 70C illustrates a clock generation circuit that provides a clock signal bclk to external bus interface 32. A clock divisor control register 36C provides a clock divisor to a digitally-controlled oscillator (DCO) circuit 80, that generates clock signal bclk with a frequency dependent on the divisor value provided in clock divisor control register 36C. A critical transfer mode indication mode_crit_xfer is available from external bus interface 32 indicating that a transfer such as a synchronous/isochronous block transfer is in progress. When critical transfer mode indication mode_crit_xfer is asserted during a block transfer, new divisor values are prevented from being written to divisor control register 36C.

In summary, this disclosure shows and describes ICs and their methods of operation. The integrated circuit may include a plurality of registers and functional units for performing operations of the integrated circuit and the plurality of registers may form an addressable register space. The integrated circuit may also include a bus interface controller coupled to the plurality of registers for providing read and write access to the registers by a bus interface via the addressable register space, a state controller for managing multiple operational modes of the integrated circuit; and an access control manager coupled to the state controller and the bus interface controller. The access control manager may assert a dynamic lock over read or write accesses to the registers according to a selected operating mode and one or more protected addresses of the addressable register space corresponding to the current operating mode. The one or more protected addresses may have a corresponding one or more sets of valid or invalid data values, and the access control manager may further include a data screener that compares the data associated with the read or write accesses to the sets of valid or invalid data values for the current operating mode and the protected addresses. The access control manager may permit or deny the read or write accesses in conformity with a result of the comparing. The bus interface controller may couple the IC to an external device and/or to one or more of the functional units. The access control manager may assert the dynamic lock over read or write accesses to the registers according to a current operating mode of the integrated circuit selected from among the multiple operational modes of the integrated circuit and according to a corresponding one or more protected addresses of the addressable register space specified for the current operating mode of the integrated circuit, so that access to the one or more protected addresses specified for the current operating mode may be controlled. Access to addresses of the addressable register space other than the one or more protected addresses specified for the current operating mode may be permitted. The one or more protected addresses may be specified for the multiple operating modes may have a corresponding one or more sets of valid or invalid data values for the protected addresses/operating mode combinations.

In some example embodiments, the bus interface controller may grant read and write access to any of the plurality of registers when the dynamic lock is not asserted. In some example embodiments, the sets of valid or invalid data values may be register values stored in corresponding addresses specified by read operations, and the data screener may compare a current value of registers specified by the read accesses to the set of valid or invalid data values corresponding to the current operating mode when the dynamic lock is asserted, and may permit or deny the read accesses in conformity with the result of the comparison. In some example embodiments, valid or invalid data values may be valid or invalid write values, and the data screener may compare input data received from the bus interface controller for a write access to the set of valid or invalid write values corresponding to the current operating mode when the dynamic lock is asserted, and may permit or deny the write accesses in conformity with the result of the comparing.

In some example embodiments, at least one of the one or more specified addresses may be a command register for initiating command driven operations. In some example embodiments, the current operating mode may be an authentication operating mode, the command driven operations may include cryptographic operations performed using an authentication private key, and the set of invalid data values may include write values corresponding to a set of non-security atomic level commands that may reveal the authentication private key, so that the access control manager permits initiation of authentication commands, while preventing initiation of the non-security atomic level commands while the current operating mode is the authentication operating mode.

In some example embodiments, the one or more specified addresses may contain values that control one or more selectable clock frequencies of corresponding ones of the functional units. The current operating mode may indicate processing of a critical transfer operation for which a subset of the one or more selectable clock frequencies is permissible, and the one or more sets of invalid data values may correspond to impermissible clock frequencies, so that the access control manager permits selection of the permissible clock frequencies, while preventing selection of the impermissible clock frequencies while the critical transfer operation is completed.

In some example embodiments, the one or more specified addresses may contain values that control a gain of an audio amplifier, and the current operating mode may indicate a condition under which a power supply current limit of a power supply providing current to the audio amplifier may be reached. The one or more sets of invalid data values may correspond to gain values exceeding a limit, so that the access control manager permits control of the gain of the audio amplifier, while preventing selection of gain values that exceed the limit. In some example embodiments, the limit may be adjusted dynamically in conformity with a signal amplitude provided to the audio amplifier and a level of available current available from the power supply.

In some example embodiments, the IC may be a camera control IC incorporating the plurality of registers, the bus interface controller, the state controller, and the access control manager, so that the access control manager may control secured access to camera data through the bus interface controller.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to a multi-IC subsystem having operating mode-based securing of addressable register spaces.

What is claimed is:

1. An integrated circuit, comprising:
  a plurality of registers and functional units for performing operations of the integrated circuit, wherein the plurality of registers forms an addressable register space;
  a bus interface controller coupled to the plurality of registers for providing read and write access to the registers by a bus interface via the addressable register space;
  a state controller for managing multiple operational modes of the integrated circuit; and
  an access control manager coupled to the state controller and the bus interface controller that asserts a dynamic lock over read or write accesses to the registers according to a selected operating mode and one or more protected addresses of the addressable register space corresponding to the current operating mode, wherein the one or more protected addresses have a corresponding one or more sets of valid or invalid data values, and wherein the access control manager further comprises a data screener that compares the data associated with the read or write accesses to the sets of valid or invalid data values for the current operating mode and the protected addresses, and wherein the access control manager permits or denies the read or write accesses in conformity with a result of the comparison.

2. The integrated circuit of claim 1, wherein the bus interface controller grants read and write access to any of the plurality of registers when the dynamic lock is not asserted.

3. The integrated circuit of claim 1, wherein the sets of valid or invalid data values are register values stored in corresponding addresses specified by read operations, and wherein the data screener compares a current value of registers specified by the read accesses to the set of valid or invalid data values corresponding to the current operating mode when the dynamic lock is asserted, and permits or denies the read accesses in conformity with the result of the comparing.

4. The integrated circuit of claim 1, wherein the sets of valid or invalid data values are valid or invalid write values, and wherein the data screener compares input data received from the bus interface controller for a write access to the set of valid or invalid write values corresponding to the current operating mode when the dynamic lock is asserted, and permits or denies the write accesses in conformity with the result of the comparing.

5. The integrated circuit of claim 4, wherein at least one of the one or more specified addresses is a command register for initiating command driven operations.

6. The integrated circuit of claim 5, wherein the current operating mode is an authentication operating mode, wherein the command driven operations include cryptographic operations performed using an authentication private key, and wherein the set of invalid data values includes write values corresponding to a set of non-security atomic level commands that may reveal the authentication private key, whereby the access control manager permits initiation of authentication commands, while preventing initiation of the non-security atomic level commands while the current operating mode is the authentication operating mode.

7. The integrated circuit of claim 4, wherein the one or more specified addresses contain values that control one or more selectable clock frequencies of corresponding ones of the functional units, wherein the current operating mode indicates processing of a critical transfer operation for which a subset of the one or more selectable clock frequencies is permissible, wherein the one or more sets of invalid data values correspond to impermissible clock frequencies, whereby the access control manager permits selection of the permissible clock frequencies, while preventing selection of the impermissible clock frequencies while the critical transfer operation is completed.

8. The integrated circuit of claim 4, wherein the one or more specified addresses contain values that control a gain of an audio amplifier, wherein the current operating mode indicates a condition under which a power supply current limit of a power supply providing current to the audio amplifier may be reached, wherein the one or more sets of invalid data values corresponds to gain values exceeding a limit, whereby the access control manager permits control of the gain of the audio amplifier, while preventing selection of gain values that exceed the limit.

9. The integrated circuit of claim 8, wherein the limit is adjusted dynamically in conformity with a signal amplitude provided to the audio amplifier and a level of available current available from the power supply.

10. The integrated circuit of claim 1, wherein the integrated circuit is a camera control integrated circuit incorporating the plurality of registers, the bus interface controller, the state controller and the access control manager, whereby the access control manager controls secured access to camera data through the bus interface controller.

11. A method of protecting registers of an integrated circuit during security operations, the method comprising:
  storing data and control values used by functional units of the integrated circuit for performing operations of the integrated circuit in a plurality of registers, wherein the plurality of registers forms an addressable register space;
  providing read and write access to the registers by a bus interface via the addressable register space;
  managing multiple operational modes of the integrated circuit;
  asserting a dynamic lock over read or write accesses to the registers according to a selected operating mode and one or more protected addresses of the addressable register space corresponding to the current operating mode, wherein the one or more protected addresses have a corresponding one or more sets of valid or invalid data values; and
  controlling access to the protected addresses by comparing data associated with the read or write accesses to the sets of valid or invalid data values for the current operating mode and the protected addresses, and wherein the asserting of the dynamic lock permits or denies read or write accesses in conformity with a result of the comparing.

12. The method of claim 11, further comprising granting read and write access to any of the plurality of registers when the dynamic lock is not asserted.

13. The method of claim 11, wherein the sets of valid or invalid data values are register values stored in corresponding addresses specified by read operations, and wherein the controlling access compares a current value of registers specified by the read accesses to the set of valid or invalid data values corresponding to the current operating mode when the dynamic lock is asserted, and permits or denies the read accesses in conformity with the result of the comparing.

14. The method of claim 11, wherein the sets of valid or invalid data values are valid or invalid write values, and wherein the controlling access compares input data received from the bus interface for a write access to the set of valid or invalid write values corresponding to the current operating mode when the dynamic lock is asserted, and permits or denies the write accesses in conformity with the result of the comparing.

15. The method of claim 14, wherein at least one of the one or more specified addresses is a command register for initiating command driven operations.

16. The method of claim 15, wherein the current operating mode is an authentication operating mode, wherein the command driven operations include cryptographic operations performed using an authentication private key, and wherein the set of invalid data values includes write values corresponding to a set of non-security atomic level commands that may reveal the authentication private key, whereby the controlling access permits initiation of authentication commands, while preventing initiation of the non-security atomic level commands while the current operating mode is the authentication operating mode.

17. The method of claim 14, wherein the one or more specified addresses contain values that control one or more selectable clock frequencies of corresponding ones of the functional units, wherein the current operating mode indicates processing of a critical transfer operation for which a subset of the one or more selectable clock frequencies is permissible, wherein the one or more sets of invalid data values corresponds to impermissible clock frequencies, whereby the controlling access permits selection of the permissible clock frequencies, while preventing selection of the impermissible clock frequencies while the critical transfer operation is completed.

18. The method of claim 14, wherein the one or more specified addresses contain values that control a gain of an audio amplifier, wherein the current operating mode indicates a condition under which a power supply current limit of a power supply providing current to the audio amplifier may be reached, wherein the one or more sets of invalid data values corresponds to gain values exceeding a limit, whereby the controlling access permits control of the gain of the audio amplifier, while preventing selection of gain values that exceed the limit.

19. The method of claim 18, wherein the limit is adjusted dynamically in conformity with a signal amplitude provided to the audio amplifier and a level of available current available from the power supply.

20. The method of claim 11, wherein the integrated circuit is a camera control integrated circuit incorporating the plurality of registers, whereby the method controls secured access to camera data through the bus interface controller.

* * * * *